SEWAGE CLARIFICATION—COMPARISON OF Al(III) AND Fe(III) SALTS

United States Patent Office 3,733,265
Patented May 15, 1973

3,733,265
CROSS-FLOW FILTRATION PROCESS FOR REMOVAL OF TOTAL ORGANIC CARBON AND PHOSPHATES FROM AQUEOUS SEWAGE EFFLUENTS
Kurt A. Kraus, Oak Ridge, and Harvey A. Mahlman, Knoxville, Tenn., assignors to the United States of America as represented by the United States Atomic Energy Commission
Filed Nov. 22, 1971, Ser. No. 200,840
Int. Cl. C02c 5/06
U.S. Cl. 210—23
7 Claims

ABSTRACT OF THE DISCLOSURE

An improved method is provided for removing the organic and phosphate content of an aqueous feed which comprises adding an effective amount of a salt which hydrolyzes to a hydrous oxide to said feed and then passing the thus-treated feed tangentially past one face of a porous substrate at a pressure sufficient to produce a clarified filtrate on an opposite face of said substrate.

BACKGROUND OF THE INVENTION

Figure 1:
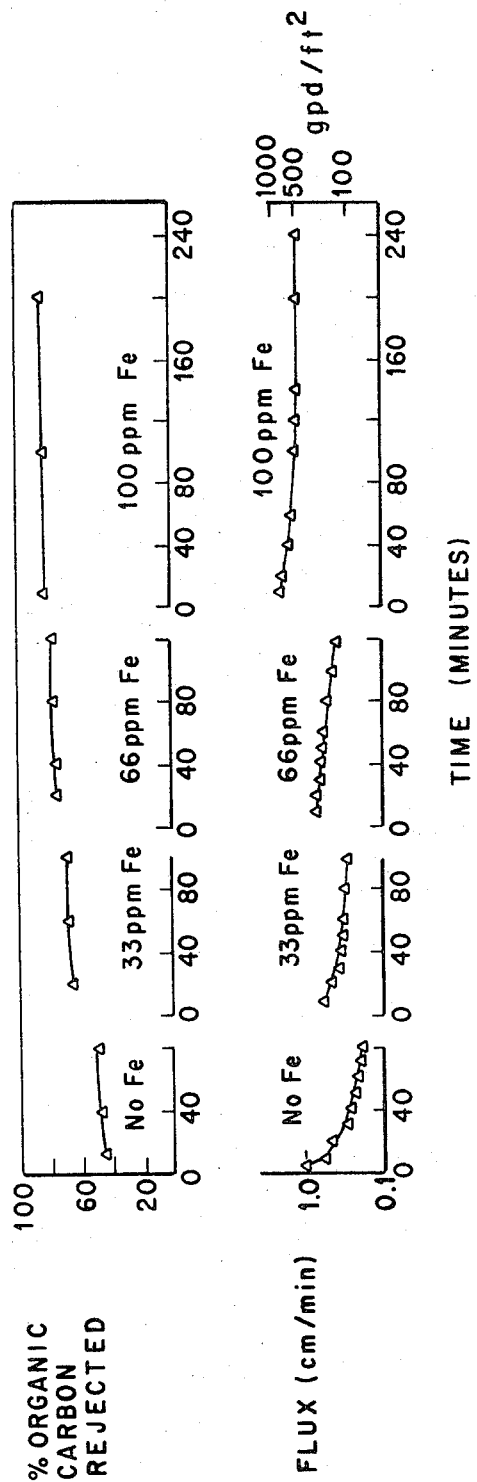

The invention described herein was made in the course of, or under, a contract with the U.S. Atomic Energy Commission.

The present invention relates to a pollution control process for the clarification of aqueous sewage effluents. More particularly, it relates to an improved cross-flow filtration process for the removal of the organic (TOC) and phosphate content of aqueous sewage effluents as typified by primary and secondary sewage. The improved process of this invention produces a water product which satisfies the requirements imposed by pollution control authorities, allowing it to be safely released to public streams.

As conducive to a clear understanding of the present invention, we define a number of terms and measurement techniques which will be used in the ensuing description.

(1) Cross-flow filtration: A separation process in which a solution or suspension is flowed tangentially past one face of a porous substrate at a pressure sufficient to generate a clarified filtrate at the opposite side of said substrate.

(2) Primary sewage effluent (PSE): The liquid phase resulting from sedimentation of a previously untreated sewage feed where the sedimentation process effects removal of grit and heavy solids.

(3) Secondary sewage effluent: The product resulting from treating PSE by a further sedimentation process after treatment, by biological oxidation for example, to reduce the amount of TOC in the effluent. Further (tertiary) treatment using sand filtration or filtration through large beds of activated charcoal is sometimes employed to improve the quality of the product water piror to discharge to public streams.

(4) Total organic carbon (TOC): The sum of organic ingredients of a sample in whatever form they exist in a feed or product sample. The total organic content was determined by means of a Beckman total carbon analyzer, Model 915, Beckman Instruments, Inc. Operation of the instrument is based upon the combustion of a sample in the presence of oxygen carrier gas to $CO_2$ which is then analyzed with an infrared analyzer and a signal proportional to $CO_2$ concentration is recorded. In practice, organic and inorganic carbonaceous compounds and oxygen carrier gas pass through a furnace packed with cobalt oxide impregnated asbestos at 950° C. where combustion to $CO_2$ and $H_2O$ takes place. The inorganic carbonaceous material is determined on a second sample by introducing the sample with carrier gas into a furnace containing quartz chips wetted with 85% phosphoric acid. The total organic carbon is the difference between these two determinations.

(5) Jackson turbidity units (JTU): A measure of turbidity by nephelometry. For the analyses cited, a Hach turbidimeter, Model 2100, Hach Chemical Company, was used. The method employed was that described in "FWPCA Methods for Chemical Aanalysis of Water and Wastes" (U.S. Department of the Interior, November 1969), pages 275–280.

(6) Phosphate content was measured by a colorimetric method outlined in "FWPCA Methods for Chemical Analysis of Water and Wastes" (U.S. Department of the Interior, November 1969), pages 223–232. In this method, ammonium molybdate and potassium antimonyl tartrate react to form an antimonyl-phosphate-molybdate complex which is reduced to an intensely blue-colored complex of ascorbic acid.

(7) Product flux: A measure of the rate of product water produced, stated in terms of cm./min., where 1 cm./min. is equal to 353.5 gallons per day per square foot (g.p.d./ft.$^2$).

(8) Product water: The composition of the aqueous product which satisfies specifications imposed by pollution control authorities in terms of turbidity, TOC, and phosphate content of treated sewage effluents suitable for discharge into public streams. While such specifications vary, the product was produced by this invention will generally satisfy most specifications imposed by pollution control authorities.

THE PRIOR ART

Prior-art methods of clarifying primary and secondary sewage involve sedimentation, coupled with filtration aids in large-scale, stationary treatment plants requiring a large capital expenditure. On the other hand, the technique of cross-flow filtration offers the promise of reducing the large-scale capital equipment size and cost usually involved in treating primary and secondary sewage or other municipal and industrial wastes. Moreover, it has especially great potential for small-scale operation in relatively low populated areas where, because of cost, a sewage treatment tank farm system might not be feasible. Cross-flow filtration has especial promise because it can be set up to operate as a mobile apparatus for meeting particular or infrequent occasions which require clarification of a specific inventory of aqueous sewage. Experience has shown that present cross-flow filtration processes have two main limitations which mitigate against treatment of sewage or other process effluents on a practical level. The first is that there is a flux drop soon after startup down to impractically low rates of product water production. The second is that cross-flow filtration as known prior to this invention does not remove phosphate from an aqueous sewage feed.

SUMMARY OF THE INVENTION

With this background in mind, it is an object of this invention to improve the efficiency of cross-flow filtration of aqueous feeds in general, aqueous sewage effluents in particular, in terms of flux and TOC and phosphate rejection.

The invention is predicated on the discovery that, when at least one additive selected from powdered carbon, a salt of hydrous metal oxide, or the hydrous oxide, as such, is included in an aqueous feed sewage in small but effective amounts, then the sharp drop in flux, normally seen when primary or secondary sewage is subjected to cross-flow filtration, is averted. Instead, we have noted that with increasing amounts of additive a steadily increasing flux accompanied by progressive increases in the amount of TOC rejection will occur. Use of the additives of this invention results in the additional benefit of quantitatively removing phosphates from a phosphate-containing feed.

An inorganic salt of a metal which forms an anion exchange active hydrous metal oxide may be used to realize the object and advantages of this invention. As a practical matter, the preferred salts are selected from those which are cheap and readily available. Salts of iron and aluminum in the +3 oxidation state are the preferred from this standpoint. Of the many ferric salts which are useful in this context we have tried $FeCl_3$, ferric ammonium sulfate, and ferric sulfate as additives to aqueous sewage effluents and have found them to be eminently effective in maintaining a usefully high flux while rejecting a high percentage of TOC as well as phosphates. Of the available aluminum salts, alum and aluminum sulfate can be used with advantage to remove organic carbon and maintain a usefully high product flux. Other salts which hydrolyze to form a hydrous oxide are within the scope of this invention but are not preferred because of economic considerations. Thus, by way of example, the salts of zirconium, titanium, tin, and rare earths such as cerium and lanthanum hydrolyze to form hydrous metal oxides but are less readily available or more expensive than the salts of iron or aluminum.

It should be understood that the hydrolyzable salts may be introduced as an additive to the aqueous feed in the unhydrolyzed or hydrolyzed state. Thus, in one mode of practicing the invention, a hydrolyzable salt is added directly to the feed and premixed prior to effecting cross-flow filtration. In another mode, a suitable salt may be hydrolyzed in a separate operation to be thereafter mixed with the feed prior to undergoing cross-flow filtration.

The improved efficiency in clarification and flux is realized by utilizing quite low concentrations of additive. For example, the addition of as little as 30 p.p.m. $Fe^{+++}$ will result in appreciable increase in flux, TOC and phosphate removal relative to a cross-flow filtration conducted in the absence of an effective iron level. The various salts of iron and aluminum appear to have equal efficiency, on an equimolar basis, in removing TOC and phosphate and maintaining a satisfactory product flux. The enhancement of product flux which we have observed is indeed surprising because the additives themselves are considered to be extremely difficult to filter. In addition, one would normally expect that addition of finely divided materials would impede, not enhance, flux. Instead, we have found just the opposite effect to occur.

There are various modes of conducting cross-flow filtration which can be used to practice the process of this invention, all of which involve fairly simple arrangement. In one case, termed an internal flow-through unit, a length of porous support is securely fastened between two pieces of pipe. The feed solution is pumped through the porous support and filtration occurs from the inside outwards. A second variation, termed external flow-through, involves passing feed through an annulus defined between a porous support (or arrays of such supports) and an outer jacket made of plastic or steel, for example, where the filter may consist of a length of fire hose jacketing wrapped around a porous or perforated supporting steel or other porous metal or plastic tubing. This arrangement allows back-flushing by passing pressurized water, air, or other gas through the support tube to dislodge accumulated sludge on the surface of the filter material. Still a third unit is a modification of the external flow arrangement to allow the use of a fluidized bed to operate in the annulus. Here, the annular space between the porous support and the jacket contains fluidizing particles, such as stainless steel particles. The unit is operated essentially vertically and the velocity of the feed flowing upwardly through the annulus is controlled to fluidize the stainless steel particles and maintain sufficient turbulent action to keep the filter free of excessive cake buildup.

In a typical procedure, an appropriate amount of metal salt is mixed with a given volume of primary sewage effluent whereupon the salted mixture is pumped through a filter test unit of the internal or external flow-through type at a pressure and velocity sufficient to effect cross-flow filtration. Typical pressures used were in the range of 3 to 100 p.s.i. and cross-flow velocity in the range 2 to 30 ft./sec.

The filtering medium useful in conducting a cross-flow filtration process in accordance with this invention comprises a porous substrate material having pores of from 5 to as much as 2000 microns in size, aided, in cases where needed to modify pore size, by an inert filter aid material deposited on the feed side of the substrate material. The substrate material may comprise flexible, pressure-resistant fire hose jacket, for example, made from polyester warp with nylon filler; stainless steel or other metal screening; nylon, polyester, or other synthetic screens; and porous ceramic or carbon. The filter aid may be selected from such material as diatomaceous earth, perlite, asbestos fiber, cellulose fiber, silica gel, and carbon fiber or powder. Neither particle shape nor size is critical so long as the filter aid serves to control pore size. The filter aid particles may be deposited as a thin bed on the substrate by passing a slurry of the particles over the substrate in a pretreatment step or may be incorporated in the feed to be filtered. The depth of the deposited filter aid material may range from one to several thousand microns.

In compiling test results, flux, turbidity, organic carbon, inorganic carbon, and phosphate concentration are the averages of several samples taken during the processing of a particular run.

The following examples are provided to display representative embodiments and processing parameters for operating a cross-flow filtration process with a feed including the specified additives.

EXAMPLE I

An internal cross-flow filtration unit was operated at 50 p.s.i. and a feed velocity of 15 ft./sec. The feed consisted of a primary sewage effluent containing 99 p.p.m. (.0018 M) $Fe^{+++}$ added as $FeCl_3$. For purposes of comparison, a similar volume of feed was circulated through an external flow arrangement containing a fluidized bed of stainless steel particles having an average size of $1/16$ inch at a fluidizing velocity. The results are summarized in Table I.

TABLE I

Sewage Clarification—Comparison of Fluidized Beds with a High Axial Velocity System ($FeCl_3$ as Clarifying Agent)

|  | Fluidized bed | | Internal flow-thru | |
|---|---|---|---|---|
|  | Feed | Product | Feed | Product |
| Pressure (p.s.i.) | 15 |  | 50 |  |
| Cross-flow velocity (ft./sec.) | 0.27 |  | 15 |  |
| Fe(III) as $FeCl_3$ (p.p.m.) | 99 |  | 99 |  |
| Turbidity (JTU) | 83 | 0.7 | 83 | 0.4 |
| Organic carbon (p.p.m.) | 114 | 17 | 114 | 15 |
| Inorganic carbon (p.p.m.) | 35 | 1 | 35 | 1 |
| Phosphate (p.p.m.) | 29 | <0.1 | 29 | <0.1 |
| Flux (cm./min.) after: |  |  |  |  |
| 10 min |  | 0.44 |  | 2.67 |
| 300 min |  | 0.25 |  | 0.96 |

It will be seen that significant clarification as well as dramatic reduction in carbon and phosphate content was effected in either mode of operation. While operation of a fluidized bed involves a penalty in terms of product throughput rate, it may be counter-balanced by savings in pumping energy since cross-flow filtration in the presence of fluidized particles can be operated at very much lower cross-flow velocities and even under gravity flow.

EXAMPLE II

A series of experiments were conducted to evaluate the effectiveness of $Fe^{+++}$ salts to remove organic carbon from primary sewage effluent. Filtration efficiencies were measured at zero, 33 p.p.m., 66 p.p.m., and 100 p.p.m. $Fe^{+++}$ added as $Fe(NH_4)(SO_4)_2$ to primary sewage effluent and filtered under identical conditions The results are shown in FIG. 1, which displays flux and amount of carbon rejected as a function of various $Fe^{+++}$ concentrations over a period of time up to 4 hours of operation. The curves show the dramatic effect of the additive on the flux and degree of carbon removed. Where no iron in the feed was used, the flux degraded rapidly. As increasing amounts of ferric salt were added, the flux increased from a low of less than 0.2 cm./min. to an average which was greater than 1 cm./min. Once sufficient Fe(III) is present to exchange with the $PO_4^\equiv$ there is no detectable effect of increased Fe(III) concentration on phosphate removal. Turbidity of the product appears to be unaffected by Fe(III) concentration.

EXAMPLE III

Figure 2:
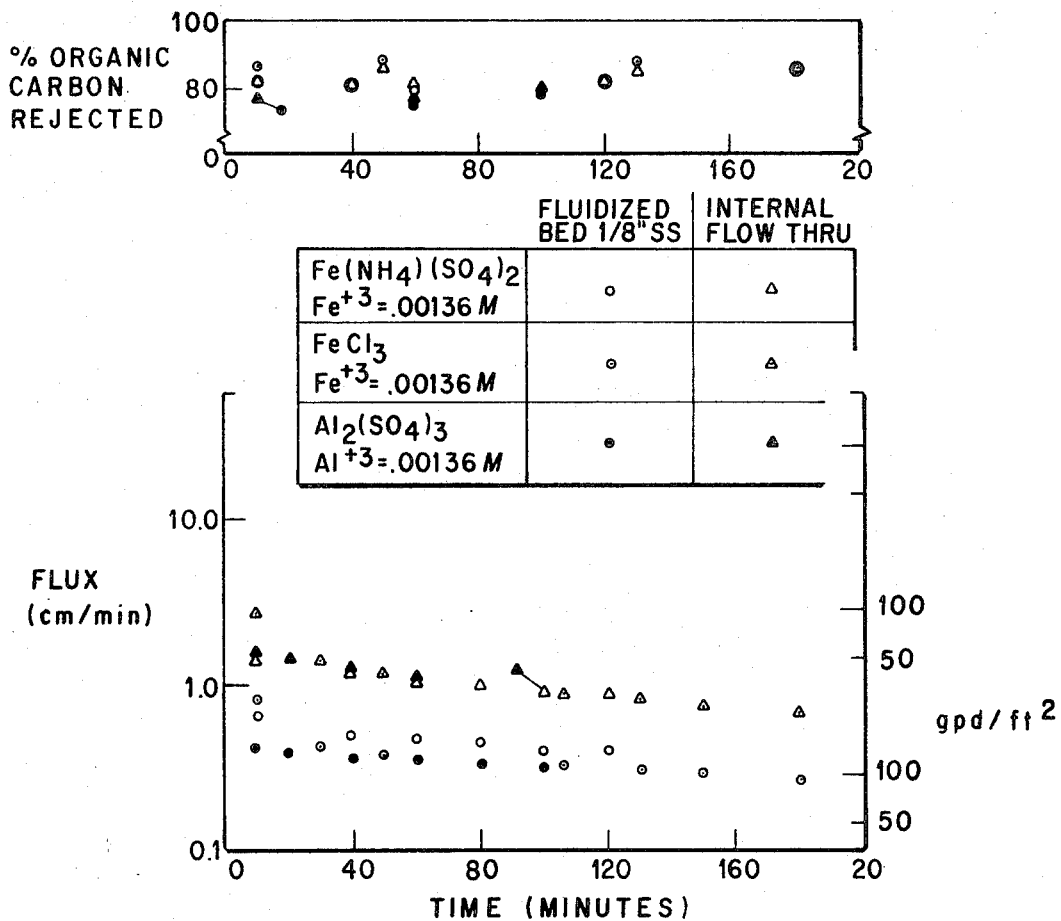

This example was designed to elucidate the clarification efficiency of several additives under two modes of cross-flow filtration, by the internal flow-through method and by the external flow method with a fluidized bed. The salts used were $FeCl_3$, $Fe(NH_4)(SO_4)_2$, and $Al_2(SO_4)_3$. The results are shown graphically in FIG. 2, where it can be seen that the three additives have equal efficiency to remove organic carbon and maintain product flux as compared on an equimolar basis. Phosphate concentration was <0.1 p.p.m. in all cases from an original phosphate level of from 30 to 50 p.p.m.

EXAMPLE IV

This example was designed to delineate the effects of axial velocity of feed past the filtering surface and operating pressure in a cross-flow filtration apparatus operating in the external flow mode using a woven polyester-nylon fire hose jacket as the filter. The feed was a primary sewage effluent containing 83 p.p.m. $Fe^{+++}$. Operating pressures were in the range 15–50 p.s.i. and axial velocities in the range 7–30 ft./sec. The results are summarized in Table II.

TABLE II

Turbidity and total organic carbon as a function of pressure and cross-flow velocity

| Pressure (p.s.i.) feed | Cross-flow velocity (ft. sec.⁻¹) feed | Turbidity (JTU) Feed | Turbidity (JTU) Product | Total organic carbon (P.p.m.) Feed | Total organic carbon (P.p.m.) Product | Percent rejection | Flux at 100 min. (cm./min.) product |
|---|---|---|---|---|---|---|---|
| 50 | 7.5 | 50 | 0.75 | 42.4 | 10.0 | 76.5 | 0.90 |
|  | 10.0 | 50 | 0.64 | 42.4 | 9.9 | 76.7 | 1.32 |
|  | 15.0 | 50 | 0.34 | 42.4 | 9.8 | 76.9 | 1.19 |
|  | 15.0 | 55 | 0.61 | 55.6 | 15.0 | 73.0 | 0.95 |
|  | 30.0 | 55 | 0.43 | 55.6 | 11.4 | 79.5 | 1.02 |
| 30 | 7.0 | 62 | 0.56 | 136.4 | 29.9 | 78.9 |  |
|  | 14.0 | 62 | 0.50 | 136.4 | 31.1 | 77.2 | 0.68 |
|  | 20.0 | 62 | 0.53 | 136.4 | 31.2 | 77.1 | 0.71 |
| 15 | 7.0 | 60 | 0.52 | 97.8 | 20.6 | 78.9 | 0.74 |
|  | 14.0 | 60 | 0.58 | 97.8 | 20.5 | 79.0 | 0.69 |

The data indicate that similar degrees of clarification and organic carbon removal are effected over a rather wide range of operating pressure and feed velocity. Product fluxes are somewhat independent of operating pressures. Product flux, on the other hand, appears to be a function of circulation (or cross-flow) velocity, since, in general, flux decreases with circulation velocity.

EXAMPLE V

This example was run as an experiment attempting to elucidate a possible mechanism which would explain the improved flux and clarification obtained by use of the additives (carbon and hydrolyzable salts) within the scope of our invention. The salts, when added to an aqueous feed, are hydrolyzed to form a hydrous oxide which is thought to have a high surface (and thereafter high sorptive) area. Accordingly, we attempted to compare the action of hydrous oxides with a form of activated carbon, Aqua Nachar A, a product of Westvaco Chemical Company, a material known to have a high surface area and adsorptive capacity.

Several runs were carried out to investigate the effect on cross-flow filtration of such parameters as powdered carbon concentration, iron concentration, pH, cross-flow velocity, and pressure. The feed was primary sewage effluent from the sewage disposal plant of the city of Oak Ridge, Tennessee. The cross-flow filtration apparatus was of the external flow mode made using a polyester-nylon fire hose jacket as the filter medium supported by porous stainless steel tubes. A summary of the run conditions is listed in Table III.

TABLE III.—SUMMARY OF RUNS

| Expt. No. | Additive | Fe(III) TOC | Added carbon (p.p.m.) | pH | P.s.i. | Velocity (f.p.s.) | Run time (min.) |
|---|---|---|---|---|---|---|---|
| 50 |  |  |  | 7.0 | 30 | 3.75–15 | 90 |
| 50A |  |  | 50 |  | 30 | 3.75–15 | 60 |
| 50C | $FeCl_3$ | 1.0 | 50 | 4.0 | 30 | 3.75–15 | 80 |
| 51 |  |  | 200 | 7.2 | 30 | 3.75–15 | 60 |
| 51A | $FeCl_3$ | 0.7 | 200 | 6.9 | 30 | 3.75–15 | 90 |
| 51B | $FeCl_3$ | 0.7 | 200 | 4.0 | 30 | 3.75–15 | 90 |
| 56 | $FeCl_3$ | 1.1 |  | 4.0 | 100 | 27 | 210 |
| 57 | $FeCl_3$ | 1.1 |  | 4.0 | 30–100 | 19 | 300 |
| 58 | $FeCl_3$ | 2.0 |  | 4.0 | 35–100 | 20 | 300 |

The pH of the untreated PSE was 7. Additions of carbon did not affect the pH, but additions of $FeCl_3$ resulted in a decrease in pH. Highest product fluxes and lowest flux declines were observed between pH 4 and 5. At minimum Fe(III) concentrations, $H_2SO_4$ was added to reduce pH.

Figure 3:
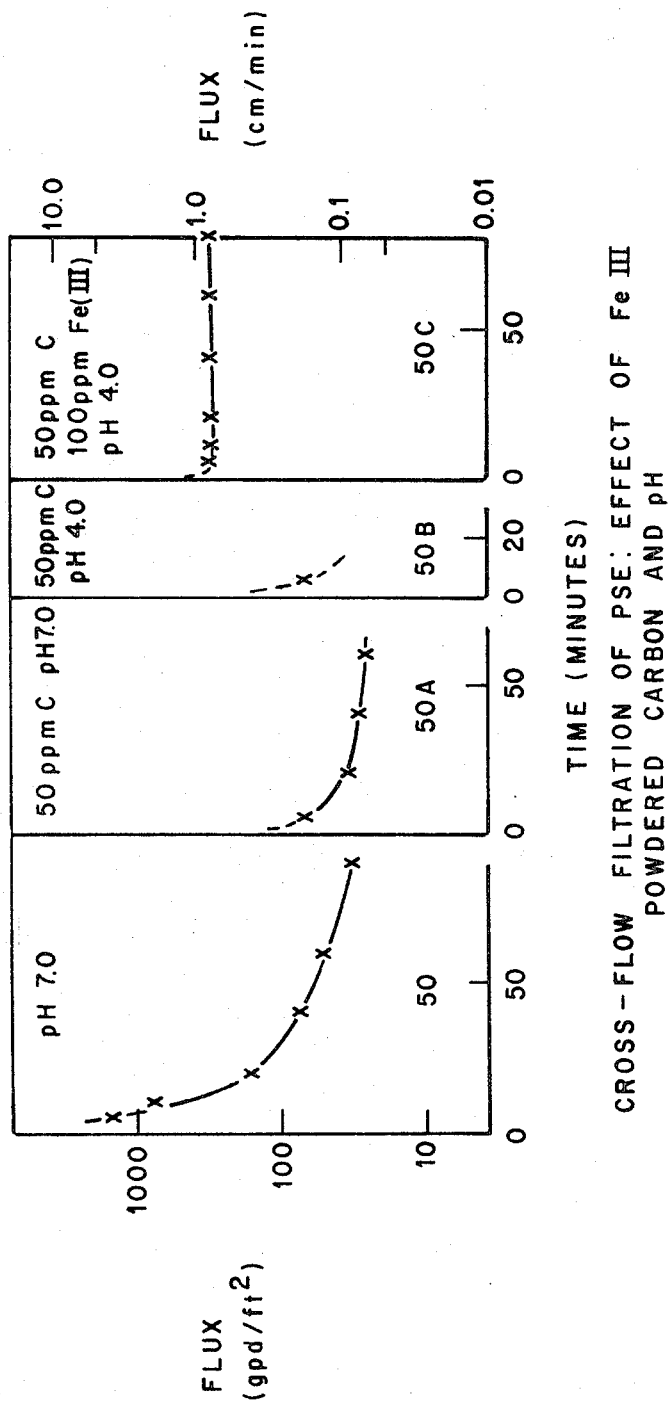

The effect of the iron and carbon additions on flux is shown in FIG. 3. Referring to FIG. 3, it will be seen that, when neither $Fe^{+++}$ salt nor powdered carbon was added to the sewage, very rapid flux decline occurred. Neither the addition of small amounts of carbon (50 p.p.m.) (run 50A) nor the subsequent change in pH to 4 (run 50B) prevented the rapid flux decline. In run 50B, the flux decreased sharply within 5 minutes. However, when sufficient $Fe^{+++}$ had been added to make the $Fe^{+++}$/TOC equal 1 and pH adjusted to 4 (run 50C), the flux decline was arrested. Similar results were noted in runs 51, 51A, and 51B which were carried out at carbon additions of 200 p.p.m. We have also demonstrated that substantial improvement in flux decline can be obtained by the addition of larger amounts of carbon ranging upward from a few hundred p.p.m. added carbon.

The effect of carbon, pH, and $Fe^{+++}$ on TOC and phosphate content in the product is shown in Table IV.

TABLE IV

| Expt. No. | pH | Fe(III)(p.p.m.) Feed | Fe(III)(p.p.m.) Product | Phosphate (p.p.m.) Feed | Phosphate (p.p.m.) Product | TOC (p.p.m.) Feed | TOC (p.p.m.) Product |
|---|---|---|---|---|---|---|---|
| 50 | 7.0 | 0 |  | 37 | 21.0 | 106 | 39–75 |
| 50A | 7.0 | 0 |  | 37 | 14.0 | 106 | 16–27 |
| 50C | 4.0 | 100 | 11.0 | 37 | 0.3 | 106 | 12.0 |
| 51 | 7.2 |  |  | 35 | 18.0 | 92 | 17–26 |
| 51A | 6.9 | 61 |  | 35 | 0.3 | 92 | 13.0 |
| 51B | 4.0 | 61 | 2.5 | 35 | 0.3 | 92 | 9.0 |
| 56 | 4.0 | 76 | 0.2 | 52 | 1.0 | 70 | 15.0 |
| 57 | 4.0 | 91 | 0.2 | 29 | 0.09 | 84 | 15.0 |
| 58 | 4.0 | 169 | 0.9 | 33 | 0.07 | 85 | 17.0 |

A comparison of run 51A (using a combination of ferric salt and carbon) with run 50A (using carbon alone), at relatively the same pH as run 51A, shows a similar reduction in TOC. However, in run 51A, a profound reduction in phosphate content occurred from an original feed content of 35 p.p.m. phosphate to a product containing only 0.3 p.p.m. phosphate, representing nearly hundredfold improvement. Viewing the results of FIG. 3 together with Table IV, it is seen that a preferred condition for obtaining maximum TOC and phosphate removal at an acceptably high product flux would be to operate with an effective iron and/or carbon level at an acid pH. pH control can be effected either by addition of sufficient salt or by addition of an acid such as the commonly available mineral acids.

EXAMPLE VI

Runs 56, 57, and 58 were operated at 100 p.s.i. to examine the effect of a higher pressure. Additional results beyond those shown in Tables III and IV are shown in Table V below.

TABLE V.—EXPERIMENTS AT HIGHER PRESSURES (pH 4)

| Expt. No. | Fe(III) TOC | Pressure (p.s.i.) | Velocity (ft./sec.) | Time (min.) | Flux (cm./min.) | Final Time (min.) | Final Flux (cm./min.) | Cl— (M) Feed | Cl— (M) Product | (Mg + Ca) (M) Feed | (Mg + Ca) (M) Product |
|---|---|---|---|---|---|---|---|---|---|---|---|
| 56 | 1.1 | 100 | 27 | 100 | 1.05 | 210 | 0.83 | 0.00580 | 0.00573 | 0.00152 | 0.00151 |
| 57 | 1.1 | 30 | 19 | 100 | 0.75 | 300 | 0.73 | 0.00509 | 0.00507 | 0.00173 | 0.00174 |
|    |     | 100 | 19 | 100 | 1.14 | 300 | 1.14 | 0.00509 | 0.00498 | 0.00173 | 0.00169 |
| 58 | 2.0 | 35 | 20 | 100 | 1.19 | 300 | 1.01 | 0.00863 | 0.00866 | 0.00157 | 0.00166 |
|    |     | 100 | 20 | 100 | 1.45 | 300 | 1.33 | 0.00863 | 0.00869 | 0.00157 | 0.00164 |

The fluxes obtained at 100 p.s.i. after several hours were not significantly higher than at 30 p.s.i. while still obtaining excellent filtration efficiency in terms of TOC and phosphate reduction. Under the higher pressure there was no significant chloride or alkaline earth rejection, indicating that hyperfiltration was not taking place.

It will be seen that we have provided an extremely useful process for the clarification of aqueous waste streams, as exemplified by treatment of aqueous sewage. The overall inventive concept, however, has much broader application, for example, in the treatment of such effluents as pulp mill wastes, dye mill wastes, and aqueous wastes arising from food processing. Generally, this invention can be used with great advantage for treating aqueous waste feeds containing finely divided and even collodially dispersed materials or in treating feeds which contain flocs which are either fragile or light, where conventional settling-filtering techniques cannot be employed.

What is claimed is:

1. An improved method for removing the organic and phosphate content of an aqueous feed which comprises mixing with said feed finely divided carbon or graphite and an effective amount of at least one additive selected from the group consisting essentially of a salt which hydrolyzes to a hydrous oxide, the hydrous oxide itself, adjusting the pH of said feed to a value no greater than 4, and then passing the thus mixed feed tangentially past one face of a porous substrate at a pressure of from 3 to 100 p.s.i. sufficient to produce a clarified filtrate on an opposite face of said substrate.

2. The method according to claim 1, in which the feed is a primary sewage effluent.

3. The method according to claim 1, in which the feed is a secondary sewage effluent.

4. The method according to claim 1, in which the salt is a water-soluble ferric salt.

5. The method according to claim 1, in which the salt is a water-soluble aluminum salt.

6. The method according to claim 1, in which the effective concentration of additive is that which produces a product flux greater than that produced in the absence of, or in the presence of a smaller amount of, said additive.

7. The method according to claim 1, in which the effective salt is selected from at least one salt of a metal selected from the group consisting of iron (in the +3 oxidation state), aluminum, zirconium, titanium, tin, and a rare earth metal having an atomic number from 58 to 71, inclusive.

References Cited

UNITED STATES PATENTS

| | | | |
|---|---|---|---|
| 3,490,590 | 1/1970 | Davies | 210—23 X |
| 3,398,088 | 8/1968 | Okey | 210—23 X |
| 3,480,144 | 11/1969 | Barth et al. | 210—18 X |

MICHAEL ROGERS, Primary Examiner

U.S. Cl. X.R.

210—40, 51, 75